3,203,817
SOLUTION OF ACID CASEIN AND FILM FORMING POLYMERS IN DIMETHYLSULPHOXIDE
Jean Auguste Phelisse and Eric Brasset, Lyon, France, assignors to Société des Usines Chimiques Rhone-Poulenc, Paris, France, a French body corporate
No Drawing. Filed May 12, 1960, Ser. No. 28,540
Claims priority, application France, May 14, 1959, 794,672
5 Claims. (Cl. 106—141)

This invention relates to solutions of casein, and especially to solutions of casein with another polymer, and to the production of shaped articles from such solutions.

Casein is generally brought into the form of shaped articles such as filaments, fibres or films by way of aqueous alkaline solutions. A number of organic solvents for casein are also known, e.g., organic acids, for example formic acid, di- and trichloroacetic acids, trifluoroacetic acid and salicylic acid, urea, phenol and pyridine.

Casein, as a polypeptide, possesses an excellent affinity for the usual dyes for wool, both acid dyes and basic dyes. Consequently, it is desirable to be able to incorporate it in polymers possessing low affinity for such dyes in order that they may be dyed with wool dyes. However, the simplest method, using a solution of a mixture of polymer and caesin, has not been applicable in practice because the known casein solvents are nonsolvents for a large number of polymers.

One expedient which has been adopted consists in using, instead of casein, the product prepared by degrading casein by means of boiling hydrochloric acid as far as the peptone stage. This product, which is soluble in solvents such as dimethylformamide, may be incorporated in polymers such as polyacrylonitrile.

In another method, a graft copolymer of acrylonitrile and casein has been prepared by grafting acrylonitrile on casein rendered reactive by complexing with a detergent, or by oxidation and acylation. Such methods are complicated and require additional operating steps.

It has now been found that dimethylsulphoxide is an excellent solvent for acid casein. Dimethylsulphoxide $(CH_3)_2SO$ is a liquid which solidifies at 18.5° C. and boils at 189° C. under normal pressure. It is industrially produced, and is therefore readily obtainable. Since dimethylsulphoxide is also a solvent for a number of other polymers, including polyacrylonitrile, polyvinyl chloride, copolymers of vinyl chloride and vinyl acetate, polyvinylidene chloride, glycol polyterephthalate and cellulose acetate, casein may be incorporated in these polymers by starting with a simple mixture of two solutions in this solvent. It is surprising that dimethylsulphoxide dissolves casein, since it is known that superpolyamides, which have the same polyamide structure as casein, are substantially insoluble in dimethylsulphoxide.

The casein which can be used in the preparation of the solutions in dimethylsulphoxide is acid casein, i.e., casein which has been demineralised or re-precipitated from an alkaline solution with acids. Solutions containing 15% and more of casein in dimethylsulphoxide can readily be obtained at room temperature, solutions of concentration about 15% and below being readily filterable. When such solutions are mixed with solutions of other polymers in the same solvent, the resulting solutions can be used for the formation of filaments, fibres, films and like shaped articles by evaporative or wet methods, i.e., methods in which the solvent is removed from the shaped solution by evaporation or in a coagulating liquid which is a solvent therefor but not for the casein or the other polymer. To obtain a good dyeing effect, it is sufficient to incorporate a small proportion of casein in the other polymer. Thus the casein may make up less than 50%, and especially 5–30% of the total polymer.

In order to reduce the sensitivity of the shaped articles to water and to alkaline solutions (more especially alkaline detergent solutions) it is desirable to give them an insolubilising treatment for casein, for example with the aid of formaldehyde.

The invention is illustrated in the following examples.

*Example I*

Acid casein purified by solution in an aqueous sodium hydroxide solution and re-precipitation with hydrochloric acid is dissolved in dimethylsulphoxide to give a solution containing 14% of casein. This solution is filtered through fritted glass having a porosity value of 4, and is then mixed with a polyacrylonitrile solution in dimethylsulphoxide, giving a soluiton containing 5% of casein and 15% of polyacrylonitrile. It is poured onto a plate and allowed to dry. The film obtained is transparent and homogeneous.

This film is treated at elevated temperature with a bath containing 4% of formaldehyde and 5% of zinc chloride to insolubilise its casein content.

The film thus treated is cut into test pieces on which dyeing tests are made with aqueous solutions containing 0.1% of the following dyes:

| | Schultz Farbstofftabellen | Colour Index |
|---|---|---|
| Cyanol FFG blue | No. 8,000 | No. 42,136 Acid dye. |
| Solid Green O | No. 754 | No. 42,000 Basic dye. |
| Hexamethyl violet | No. 785 | No. 42,555 Basic dye. |
| Fuchsin S | No. 800 | No. 42,685 Acid dye. |

For each dyeing test, the test piece is immersed in the solution for 1 hour at 80° C. and then washed in cold water and thereafter in tepid water and dried.

In all cases, an excellent dyeing effect is obtained. The same dye baths leave films of polyacrylonitrile containing no casein substantially undyed.

*Example II*

Purified casein (0.2 g.), identical with that used in Example I, and polyacrylonitrile (1.8 g.) were dissolved in dimethylsulphoxide (5 cc.) to give a solution containing 11% of casein based on the weight of polyacrylonitrile. This solution was then extruded as filaments on which dyeing tests were made with aqueous solutions (1 in 1000) of the following dyes.

| | Schultz Farbstofftabellen | Colour Index |
|---|---|---|
| Hexamethyl violet | No. 785 | No. 42,555 basic dye. |
| Fuchsin S | No. 800 | No. 42,685 acid dye. |

For each dyeing test the filaments were steeped in the solution for 1 hour at 80° C., washed with cold water, then with warm water, and finally dried. The same dyeing test was made on polyacrylonitrile filaments free from casein. The filaments containing 11% of casein had a uniform colour and a much deeper tint than the controls.

*Example III*

Three series of solutions of cellulose acetate and casein in dimethylsulphoxide were prepared containing respectively 5%, 15% and 25% of casein (on the weight of the cellulose acetate) by dissolving in dimethylsulphoxide (10 cc.): casein (0.1 g.) and cellulose acetate (1.9 g.); casein (0.3 g.) and cellulose acetate (1.7 g.); casein (0.5 g.) and cellulose acetate (1.5 g.).

Two control solutions were also prepared containing respectively 1.5 g. and 1.9 g. of cellulose acetate in 10 cc. of dimethylsulphoxide. The solutions were run on to plates and allowed to dry. The transparent, homogeneous films obtained were cut into test-strips and submitted to dyeing tests under the same conditions as in Example I with hexamethyl violet and fuchsin S.

While the control films remained practically colourless, the films containing casein were uniformly dyed, the tint deepening as the percentage of casein increased from 5% to 25% by weight of cellulose acetate.

*Example IV*

Two series of solutions, containing a copolymer (in the proportion 85:15) of vinyl chloride and vinyl acetate and 5 and 10% respectively of casein (based on the weight of copolymer) in dimethylsulphoxide, were prepared by dissolving in dimethylsulphoxide (10 cc.): casein (0.1 g.) and copolymer (1.9 g.); and casein (0.2 g.) and polymer (1.8 g.). A control solution containing copolymer (1.8 g.) in dimethylsulphoxide (10 cc.) was also prepared. Films were then made from these solutions, and were examples for affinity for dyes under the conditions given in Example I and using hexamethyl violet and fuchsin S. Whereas the control film remained colourless, the film containing 5% of casein was lightly dyed, and that containing 10% of casein had a deep tint, the dye being evenly distributed between it and the solvent.

We claim:

1. As a new composition of matter, a solution of acid casein in dimethylsulphoxide.

2. As a new composition of matter, a solution of up to 15% by weight of acid casein in dimethylsulphoxide.

3. As a new composition of matter, a solution in dimethylsulphoxide of acid casein and a film-forming polymer selected from the group consisting of polyacrylonitrile, cellulose acetate, a copolymer of vinylchloride and vinyl acetate, polyvinylchloride, polyvinylidene chloride, and polyethylene terephthalate which is soluble in dimethylsulphoxide, the concentration of the acid casein being at most 15% and below that of the said polymer.

4. A process for the production of readily dyeable, shaped articles, which comprises shaping a solution in dimethylsulphoxide of acid casein and a film-forming polymer selected from the group consisting of polyacrylonitrile, cellulose acetate, a copolymer of vinylchloride and vinyl acetate, polyvinylchloride, polyvinylidene chloride, and polyethylene terephthalate which is soluble in dimethylsulphoxide, in which solution the acid casein is the minor solute component and the said polymer is the major solute component.

5. Process according to claim 4, which comprises also the further step of insolubilising the casein in the article by treatment with formaldehyde.

References Cited by the Examiner

UNITED STATES PATENTS

| | | | |
|---|---|---|---|
| 2,047,143 | 7/63 | Iddings | 260—7.5 |
| 2,145,855 | 5/40 | Bley | 260—120 |
| 2,404,717 | 7/46 | Houty | 260—7.5 |
| 3,007,763 | 11/61 | Adams | 8—128 |

OTHER REFERENCES

Speel et al., Textile Chemicals & Auxiliaries, 2nd Ed., 1957, Reinhold Publishing Corp., New York, pp 20–21.

WILLIAM H. SHORT, *Primary Examiner.*

ALPHONSO D. SULLIVAN, MILTON STERMAN, JAMES A. SEIDLECK, *Examiners.*